US009157540B2

(12) United States Patent
Larsen et al.

(10) Patent No.: US 9,157,540 B2
(45) Date of Patent: Oct. 13, 2015

(54) FLUID REGULATOR WITH INTEGRATED RAPID PRESSURIZATION BYPASS VALVE

(71) Applicant: TESCOM CORPORATION, Elk River, MN (US)

(72) Inventors: Todd William Larsen, Milaca, MN (US); Chad Ray Kirchner, Sauk Rapids, MN (US); Gordon Cameron Muir, Maple Grove, MN (US)

(73) Assignee: TESCOM CORPORATION, Elk River, MN (US)

( * ) Notice: Subject to any disclaimer, the term of this patent is extended or adjusted under 35 U.S.C. 154(b) by 275 days.

(21) Appl. No.: 13/751,904

(22) Filed: Jan. 28, 2013

(65) Prior Publication Data

US 2014/0209178 A1 Jul. 31, 2014

(51) Int. Cl.
*F16K 17/20* (2006.01)
*F16K 17/00* (2006.01)
*G05D 16/10* (2006.01)
*G05D 7/01* (2006.01)

(52) U.S. Cl.
CPC .............. *F16K 17/00* (2013.01); *G05D 7/0133* (2013.01); *G05D 16/10* (2013.01); *Y10T 137/0368* (2015.04); *Y10T 137/7759* (2015.04); *Y10T 137/8733* (2015.04)

(58) Field of Classification Search
CPC .. G05D 16/10; F16K 17/00; Y10T 137/7759; Y10T 137/0368; Y10T 137/87265; Y10T 137/8733; Y10T 137/87338; Y10T 137/2562
See application file for complete search history.

(56) References Cited

U.S. PATENT DOCUMENTS 1,158,321 A * 10/1915 Shipley .......................... 417/279
3,742,972 A *  7/1973 Hughes .......................... 137/110

(Continued)

FOREIGN PATENT DOCUMENTS

| GB | 816 948 A | 7/1959 |
| GB | 2 401 164 A | 11/2004 |
| GB | 2 460 336 A | 12/2009 |

OTHER PUBLICATIONS

Search Report for PCT/US2014/013131, mailed May 4, 2015.

(Continued)

*Primary Examiner* — Jessica Cahill
(74) *Attorney, Agent, or Firm* — Marshall, Gerstein & Borun LLP

(57) ABSTRACT

A fluid flow control device includes a regulator for operating at high pressures and an integral bypass valve. The regulator and the bypass valve each include a control assembly that is movable between an open position and a closed position. The regulator and bypass valves are biased into the open positions and adapted to move into the closed positions when an operating pressure rises to above respective regulator and bypass set-point pressures. The bypass set-point pressure is lower than the regulator set-point pressure such that when the operating pressure rises above the bypass set-point pressure, the bypass valve automatically closes and allows the regulator to perform under normal operating conditions. So configured, the bypass valve is arranged to accommodate at least some of the fluid flow through the system until the operating pressure reaches the normal operating pressure, which is somewhere between the bypass and regulator set-point pressures.

20 Claims, 10 Drawing Sheets

(56) References Cited

U.S. PATENT DOCUMENTS

2004/0065368 A1\* 4/2004 Larsen ............... 137/492.5
2004/0256097 A1 12/2004 Byrd et al.
2004/0261705 A1\* 12/2004 Kang et al. ............ 118/715
2007/0181198 A1\* 8/2007 Larsen ................ 137/883
2008/0011361 A1\* 1/2008 Larsen et al. .......... 137/528
2010/0155073 A1 6/2010 Blank et al.

OTHER PUBLICATIONS

Written Opinion for PCT/US2014/013131, mailed May 4, 2015.
International Preliminary Report on Patentability and Written Opinion of the International Searching Authority, International Application No. PCT/US2014/013131, dated Aug. 6, 2015.

\* cited by examiner

FLUID REGULATOR WITH INTEGRATED RAPID PRESSURIZATION BYPASS VALVE

FIELD OF THE DISCLOSURE

The present disclosure is directed to fluid regulators and, more particularly, to fluid regulators utilized in systems that require rapid pressurization.

BACKGROUND

Fluid flow control devices such as fluid regulators are commonly employed in a variety of applications to ensure that fluid is delivered from a source to a destination without exceeding a predetermined control pressure. That is, typical pressure regulators reduce the pressure of fluid supplied from a source down to a control pressure that is suitable for the intended application.

Generally speaking, regulators are utilized in systems that are continuously pressurized. For example, in the off-shore oil and gas industry, hydraulic regulators are incorporated onto umbilical lines that feed high-pressure hydraulic fluids to subsea equipment located miles away. During normal operation, the umbilical line is fluid-filled and pre-pressurized such that the regulator simply operates to ensure that the pressure in the umbilical line does not exceed the control pressure.

Upon start-up, however, the umbilical lines are usually filled with fluid at the time they are hooked up to the regulator, but the fluid is not necessarily pressurized. Therefore, once connected, it is necessary to pressurize the line, which requires exposing the regulator to high pressure/high flow inlet and low pressure outlet conditions. Typical regulators are not designed to handle such flows and, moreover, pressurization can take longer than desired. To accommodate these situations, the fluid system can be equipped with a bypass circuit that is piped away from the regulator. Typically, a bypass circuit includes a manual valve piped between an inlet pipe that draws fluid away from the regulator and a return pipe that returns the fluid to the fluid system downstream of the regulator. Once the umbilical line or other line located downstream of the regulator is sufficiently pressurized, an operator manually closes the bypass circuit to redirect all of the fluid flow through the regulator during normal operation.

SUMMARY

One aspect of the present disclosure is directed to a fluid flow control device including a valve body, a regulator flow path, a bypass flow path, a bypass device, and a regulator. The valve body defines an inlet, an outlet, a gallery disposed between the inlet and the outlet, a regulator cavity disposed between the gallery and the outlet, and a bypass cavity disposed between the gallery and the outlet. The regulator flow path extends between the inlet and the outlet of the valve body via the gallery and the regulator cavity and has a first effective cross-sectional area. The bypass flow path extends between the inlet and the outlet of the valve body via the gallery and the bypass cavity and has a second effective cross-sectional area that is greater than the first effective cross-sectional area.

The bypass valve is connected to the valve body and includes a bypass control assembly. The bypass control assembly includes a bypass control element and a bypass biasing device. The bypass control element is movable relative to the bypass cavity of the valve body between an open position allowing fluid flow through the bypass flow path and a closed position preventing fluid flow through the bypass flow path. The bypass biasing device urges the bypass control element toward the open position such that the bypass control element only occupies the closed position when a fluid pressure in the bypass cavity is equal to or greater than a bypass set-point pressure.

The regulator is connected to the valve body and includes a regulator control assembly. The regulator control assembly includes a regulator control element and a regulator biasing device. The regulator control element is movable relative to the regulator cavity of the valve body between an open position, which does not prevent fluid from flowing through the regulator flow path, and a closed position, which does prevent fluid from flowing through the regulator flow path. The regulator biasing device urges the regulator control element toward the open position such that the regulator control element occupies the open position until a fluid pressure in the regulator cavity of the valve body is equal to or greater than a regulator set-point pressure. The regulator set-point pressure is greater than the bypass set-point pressure.

DETAILED DESCRIPTION

The present disclosure is directed to a fluid flow control device that includes a regulator with an integrated bypass valve for protecting the regulator from exposure to high velocity and high pressure fluid flows under certain operating conditions. The regulator and the bypass valve are connected by way of a common valve body that defines an inlet and an outlet. The regulator and bypass valve can each include a control assembly for controlling fluid flow along separate regulator and bypass fluid flow paths that communicate between the inlet and the outlet of the valve body. Each of the control assemblies is naturally biased into an open position, such that fluid flow is not prevented from flowing through the flow paths. Moreover, the control assemblies only move away from the open positions and into closed positions when fluid pressure within the valve body rises above associated set-point pressures. For example, in one version, a spring biases the bypass control assembly open until a pressure in the valve body reaches a bypass set-point pressure and another spring biases the regulator control assembly open until the pressure in the valve body reaches a regulator set-point pressure. As such, when both the regulator and the bypass valve are open, fluid flowing between the inlet and the outlet can frame along both the regulator and bypass flow paths. In most instances, the minimum effective cross-sectional area of the bypass flow path will be much greater than the minimum effective cross-sectional area of the regulator flow path such that a majority of the flow passes through the bypass valve. Because the bypass valve is designated to function only under certain operating conditions and the regulator is designated to operate during normal flow conditions, the set-point pressure of the two devices is different. More specifically, the set-point pressure of the bypass valve is lower than the set-point pressure of the regulator. As such, when the bypass valve closes, the regulator remains open and serves as the sole mechanism through which outlet pressure is controlled during normal operation.

Figure 1:
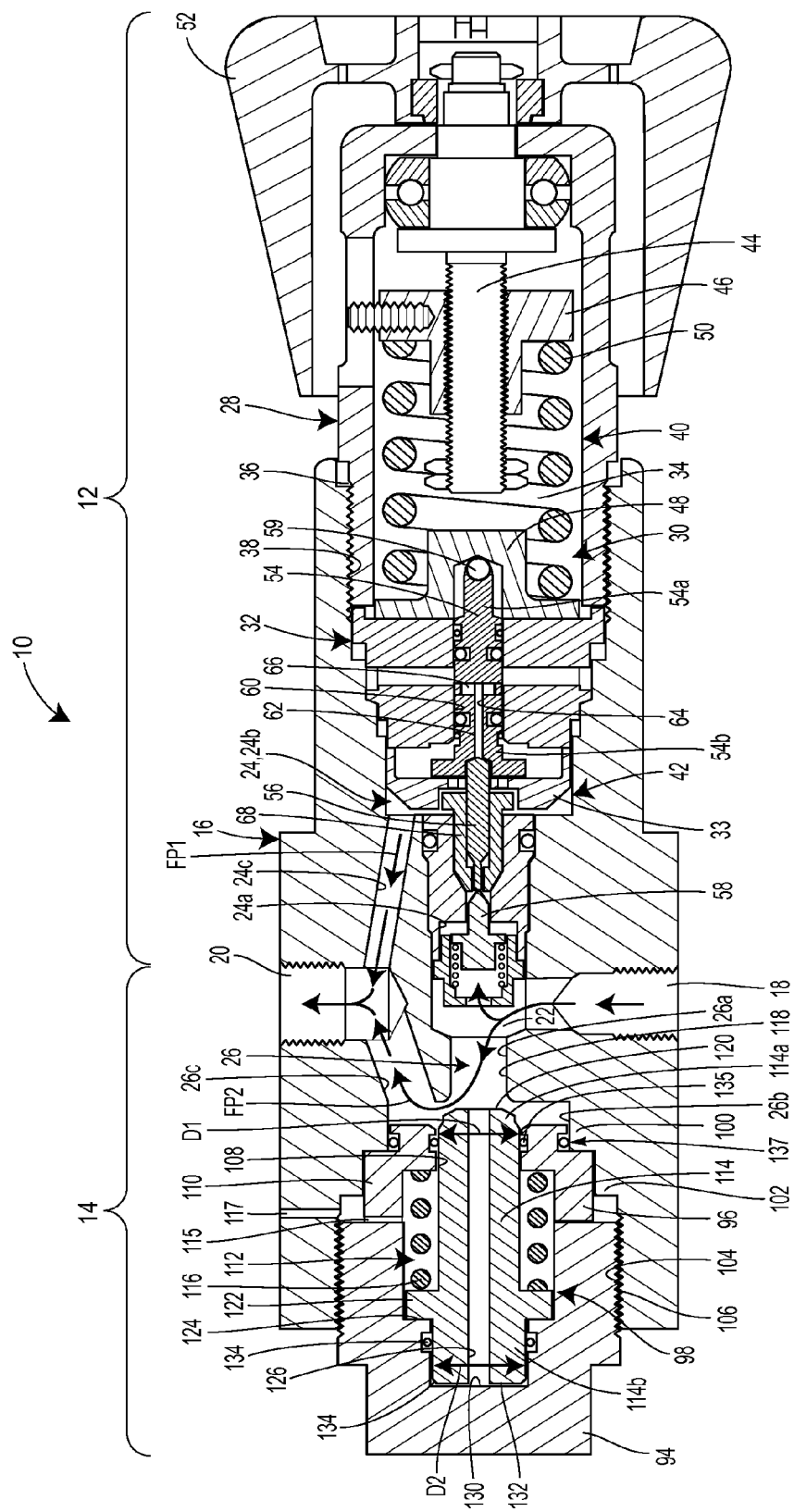
FIG. 1 is a cross-sectional side view of one version of a fluid flow control device including a regulator and an integrated bypass valve constructed in accordance with the principles of the present disclosure, showing the bypass valve in an open position.

Turning now to the figures, FIG. 1 depicts one version of a fluid flow control device 10 constructed in accordance with the principles of the present disclosure. The device 10 includes a regulator 12 and a bypass valve 14 sharing a common valve body 16. In the present version, the valve body 16 includes a one-piece valve body constructed from a single piece of material and defining an inlet 18, an outlet 20, a gallery 22, a regulator cavity 24, and a bypass cavity 26.

The gallery 22 is a generally cylindrical space formed in the center of the valve body 16 between and in communication with the inlet 18 and the outlet 20. The regulator cavity 24 is also disposed between the inlet 18 and the outlet 20 of the valve body 16 and, in the disclosed version, includes three portions: a valve portion 24a, a control portion 24b, and an exhaust portion 24c. Similarly, the bypass cavity 26 is disposed between the inlet 18 and the outlet 20 of the valve body 16 and also includes three portions: a valve portion 26a, a control portion 26b, and an exhaust portion 26c. The valve portions 24a, 26a of the regulator and bypass cavities 24, 26 extend from the gallery 22 to the respective control portions 24b, 26b, and the exhaust portions 24c, 26c extend from the respective control portions 24b, 26b to the outlet 20 of the valve body 16.

Accordingly, the valve body 12 of the disclosed version of the fluid flow control device 10 defines two fluid flow paths: a regulator flow path FP1 that extends between the inlet 18 and the outlet 20 of the valve body 16 via the gallery 22 and the regulator cavity 24, and a bypass flow path FP2 that extends between the inlet 18 and the outlet 20 of the valve body 16 via the gallery 22 and the bypass cavity 26. As illustrated in FIG. 1, the regulator and bypass cavities 24, 26 are separate from each other. Therefore, the portions of the regulator and bypass flow paths FP1, FP2 that extend through the respective cavities 24, 26 are separate from each other. The remainder of the flow paths FP1, FP 2, which reside within the inlet 18, outlet 20, and gallery 22 of the valve body 16, can be considered to be common or overlap, for example.

Still referring to FIG. 1, the regulator 12 of the depicted fluid flow control device 10 is only one example of a type of regulator that might be implemented in accordance with the present disclosure and can include, for example, a hydraulic regulator such as the TESCOM 50-2000 Series Regulator. However, the fluid flow control device 10 of the present disclosure could also include other types of regulators including, for example, any one of the following TESCOM hydraulic control series regulators: 50-2200, 54-2000, 54-2200, 54-2800, or any of the following TESCOM pneumatic control series regulators: 44-1100, 26-1000, 26-2000, 44-1300, and 44-4000. Of course, other suitable regulators not specifically mentioned could also be incorporated into the fluid flow control device 10.

In FIG. 1, the disclosed regulator 12 includes a bonnet 28, a regulator control assembly 30, a back-up sensor 32, and a spacer component 33. The bonnet 28, as shown, includes a hollow cylindrical member that defines a bonnet cavity 34 and is threadably fastened to the valve body 16. More specifically, the bonnet 28 includes a plurality of external threads 36 in threaded engagement with a plurality of internal threads 38 formed on an interior sidewall of the regulator cavity 24 of the valve body 16. The back-up sensor 32 and the spacer component 33 are secured in the regulator cavity 24 of the valve body 16 by the attachment of the bonnet 28. So configured, and as depicted the back-up sensor 32 and spacer component 33 are adapted for facilitating normal operation of the regulator 12, as well as an overpressure relief function, which will be described.

Still referring to FIG. 1, the regulator control assembly 30 of the regulator 12 includes a loading arrangement 40 and a valving arrangement 42. The loading arrangement 40 includes a central rod 44, a first spring seat 46, a second spring seat 48, and a regulator biasing device 50 in the form of a control spring for applying a bias force to the valving arrangement 42, as will be described. As shown, the central rod 44 of the disclosed control assembly 30 is mounted inside the bonnet cavity 34 and extends from an end of the bonnet 28 that is opposite the valve body 16. The first spring seat 46 is mounted on the central rod 44. The regulator biasing device 50 resides between the first and second spring seats 46, 48 and biases the second spring seat 48 away from the first spring seat 46 and toward the back-up sensor 32, which limits axial displacement of the second spring seat 48 away from the first spring seat 46. In the depicted version of the fluid flow control device 10, the first spring seat 46 is threaded onto the central rod 44 such that the axial position of the first spring seat 46 in the bonnet cavity 34 is adjustable by rotating the central rod 44 via an external adjustment knob 52. Adjusting the position of the first spring seat 46 can therefore adjust the magnitude of the force applied to the second spring seat 48 by the regulator biasing device 50, which in turn, adjusts the magnitude of the force applied to the valving arrangement 42 by the loading arrangement 40.

Figure 3:
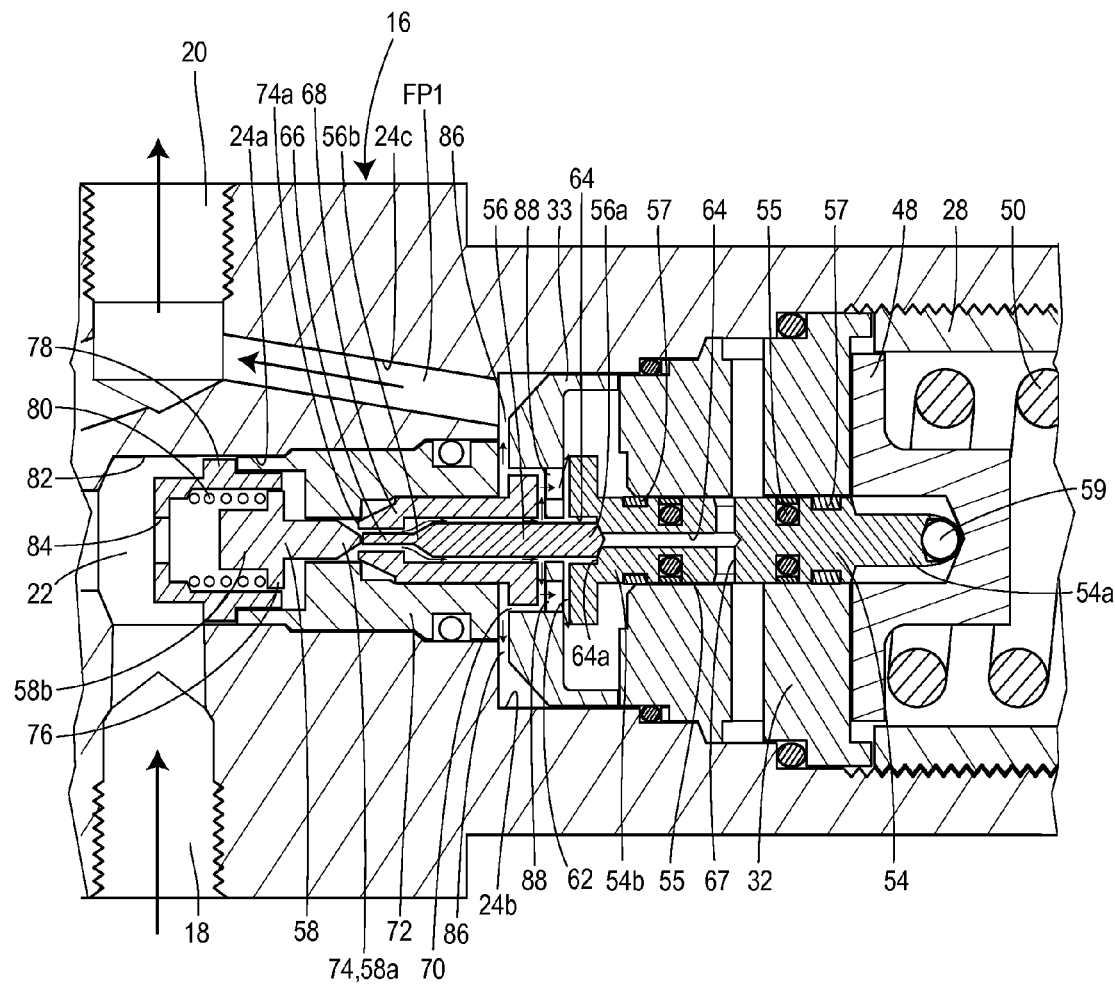
FIG. 3 is a partial detail view of the regulator of the fluid flow control device of FIGS. 1 and 2, showing the regulator in an open position.

With reference to FIG. 3, valving arrangement 42, in the disclosed version, generally includes a sensing element 54, a connector 56, and a control element 58 coaxially aligned relative to one another for opening and closing the regulator 12 in response to pressure changes in the valve body 16. As shown, the sensing element 54 is slidably disposed within a through bore 60 formed in the back-up sensor 32 and includes a first end 54a disposed proximate to the second spring seat 48 of the loading arrangement 40 and a second end 54b spaced away from the second spring seat 42. A plurality of seal members 55 (e.g. o-rings) and/or guide rings 57 can reside or the sensing element 54 to provide a seal between the sensing element 54 and the back-up sensor 33. A ball element 59 is positioned between the first end 54a of the sensing element 54 and the second spring seat 48 to ensure that the sensing element 54 maintains alignment with respect to the connector 56 and control element 58 even if the force applied to the second spring seat 48 by the regulator biasing device 50 is not directly aligned with these components. The second end 54b of the sensing element 54 includes a broadened sensing surface 62 and an axially extending blind bore 64, each of which is depicted in FIG. 3. The blind bore 64 includes a shoulder surface 64a slightly inset from the sensing surface 62 and terminates into a radial bore 67 extending laterally through the sensing element 54. The blind and radial bores 64, 67 of the sensing element 54 are for discharging excess fluid pressure out of the regulator 12 when performing an overpressure relief function, which will be described below.

Figure 2:
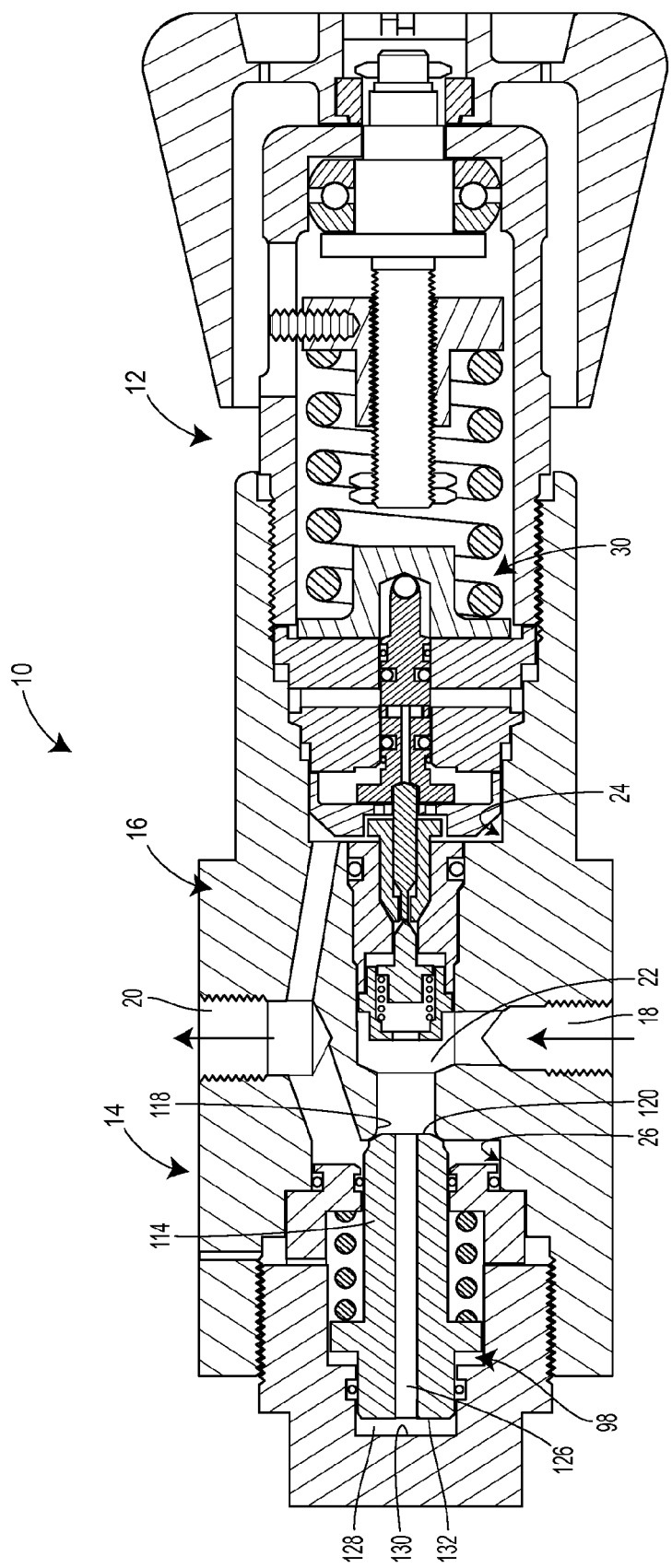
FIG. 2 is a cross-sectional side view of the fluid flow control device of FIG. 1, showing the bypass valve in a closed position.

Continuing to refer to FIG. 3, the connector 56 of the valving arrangement 42 also includes a first end 56a and a second end 56b. The first end 56a is adapted to reside within the blind bore 64 of the sensing element 54 and against the shoulder surface 64a when the regulator 12 occupies an open position, as illustrated in FIGS. 1-3. The second end 56b of the connector 56 includes a reduced diameter portion 66 slidably disposed within a seating orifice 70 of a valve seat 68. In the disclosed version 3, the valve seat 68 can include a hollow cylindrical member threadably secured into a first retainer element 72, which in turn, is threadably secured into the regulator cavity 24 of the valve body 16. As such, the valve seat 68 is fixed in position in the valve body 16 such that the connector 56 is slidably disposed therein for opening and closing the control element 58.

That is, the control element 58 of the present version can be described as a valve stem and includes a first end 58a with a tapered nose portion 74 and a second end 58b defining radially extending ears 76. As shown, the valve stem 58 is slidably disposed within a second retainer element 78 fixed within the regulator cavity 24 of the valve body 16 and is biased toward the valve seat 58 with a spring 80. The spring 80 is carried between an end wall 82 of the second retainer element 78 and the ears 76 of the valve stem 58.

As mentioned, the presently disclosed regulator 12 is biased into an open position such that the regulator control assembly 30 naturally does not prevent fluid from flowing through the regulator flow path FP1. As such, in the absence of any other obstruction, the regulator control assembly 30 allows fluid to flow through the regulator flow path FP1 when occupying the open position. More specifically, as depicted in FIGS. 1-3, in the open position the regulator biasing device 50 biases the second spring seat 48 of the loading arrangement 40 away from the first spring seat 46 and into contacting abutment with the back-up sensor 32. This positions the sensing element 54, the connector 56, and the valve stem 58 in their respective left-most positions, relative to the orientation of FIGS. 1-3. Thus, as depicted in FIG. 3, the reduced diameter portion 66 of the connector 56 extends through the seating orifice 70 of the valve seat 68 and in contacting abutment with an end 74a of the tapered nose portion 74 of the valve stem 58, thereby positioning the tapered nose portion 74 a spaced distance away from the seating orifice 70.

So configured, fluid flows from the inlet 18 of the valve body 12 through the gallery 22 and the regulator cavity 24 to the outlet 20 along the regulator flow path FP1, as indicated by the arrows provided on FIG. 3. More specifically, from the gallery 22, fluid flows through the valve portion 24a of the regulator cavity 24 via an opening 84 formed in an end of the second retainer element 78. From there, the fluid flows around the valve stem 58 and toward the sensing element 54 through the opened seating orifice 70 of the valve seat 68. Upon exiting the valve seat 68, the fluid travels from the control portion 24b of the regulator cavity 24 out to the exhaust portion 24c via one or more radial bores 86 formed in the spacer component 33. From the exhaust portion 24c of the regulator cavity 24, the fluid flows directly to the outlet 20 of the valve body 16.

As the fluid resides along the regulator flow path FP1, the pressure of the fluid in the control portion 24b of the regulator cavity 24 is continuously monitored with the sensing surface 62 of the sensing element 54. This is facilitated by the incorporation of one or more axial through bores 88 formed in the spacer component 33 adjacent to the sensing surface 62. As such, when the regulator 12 is open, the sensing element 54 continuously senses the pressure of the fluid resident on the sensing surface 62 for controlling the precise position of the connector 56 and valve stem 54.

Thus, if the pressure at the inlet 18 and therefore, in the gallery 22 ultimately rises above a predetermined regulator set-point pressure, the sensing element 54 will begin to move to the right, relative to the orientation of FIGS. 1-3, against the bias of the regulator biasing device 50. Any movement of the sensing element 54 to the right necessarily relieves the amount of force that the sensing element 54 applies to the connector 56 and valve stem 58. As such, as the sensing element 54 moves to the right, the valve stem 58 and connector 56 also move to the right under the urging of the spring 80 disposed within the second retainer element 78. As the valve stem 58 moves to the right, the tapered nose portion 74 gradually moves closer to the seating orifice 70 of the valve seat 68 and further restricts the amount of fluid flowing through the regulator flow path FP1. Of course, any reduction in the inlet pressure below the regulator set-point pressure will allow the regulator biasing device 50 to automatically reposition the sensing element 54, connector 56, and valve stem 58 to the left and into the open position depicted in FIGS. 1-3.

Figure 4:
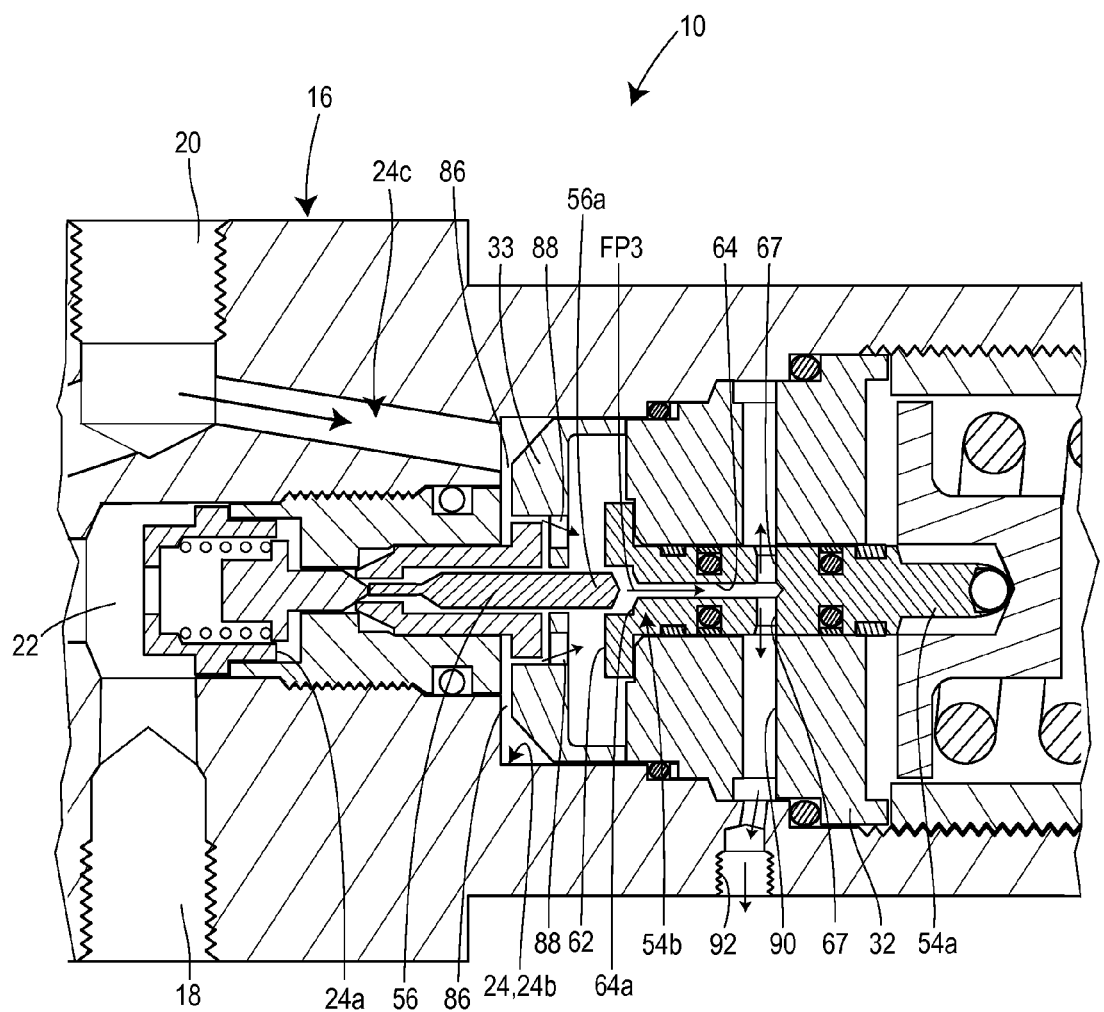
FIG. 4 is a partial detail view of the regulator of the fluid flow control device of FIGS. 1 and 2, showing the regulator performing an overpressure relief function.

As mentioned, the regulator 12 of the presently disclosed version of the fluid flow control device 10 is also equipped to perform an overpressure relief function under circumstances where, for example, a pressure at the outlet 20 of the valve body 20 becomes excessively high. With reference to FIG. 4, under such circumstances, the pressure at the outlet 20 is communicated up the exhaust portion 24c and into the control portion 24b of the regulator cavity 24, as indicated by the arrows on FIG. 4. From there, the high outlet pressure is sensed by the sensing surface 62 of the sensing element 54 via the radial and axial bores 86, 88 formed through the spacer component 33. Under this high pressure, the sensing element 54 is forced into its right-most position relative to the orientation of FIG. 4, by overcoming the force generated by the regulator biasing device 50. So configured, t the shoulder surface 64a of the blind bore 64 at the end 54b of the connector 54 displaces out of engagement with and away from the first end 56a of the connector 56. This movement opens the blind bore 64, which opens a relief flow path FP3 for exhausting the excessively high outlet pressure out of the system.

The relief flow path FP3 is defined by the blind and radial bores 64, 67 in the sensing element 54 in combination with a lateral bore 90 formed in the back-up sensor 32 and one or more vent ports 92 formed in the sidewall of the valve body 16, as illustrated in FIG. 4. Although FIG. 4 illustrates the vent port 92 exiting the valve body 16 generally parallel to the inlet and outlet 18, 20, it may be preferable to have the vent port 92 disposed perpendicular to the inlet and outlet 18, 20, depending on the ultimate end use application.

The amount of pressure required to effect this movement of the sensing element 54 to open the relief flow path FP3 is dependent on the force applied to the sensing element 54 by the regulator biasing device 50. Moreover, because the sensing element 54 no longer applies a force biasing the connector 56 to the left in FIG. 4, the valve element 58 and connector 56 are forced into their rightmost positions relative to the orientation of FIG. 4 via the spring 80 disposed in the second retainer element 78. The spring 80 therefore urges the tapered nose portion 74 of the valve stem 58 against the seating orifice 70 of the valve seat 68 to close the regulator flow path FP1. This advantageously prevents backflow to the inlet 18 of the valve body 16 and can also help expedite the overpressure relief function.

Referring back now to FIGS. 1-3, it can be seen that the regulator flow path FP1 of the disclosed fluid flow control device 10 is relatively tortuous and restricted. Therefore, the fluid flow control device 10 of the present disclosure also includes the integral bypass device 14. As depicted in FIG. 1, the bypass device 14 of the present disclosure includes a bypass dome 94, a bypass spacer 96, and a bypass control assembly 98. The bypass dome 94 includes a hollow cylindrical member removably connected to the valve body 16 adjacent to the bypass cavity 26 and, more particularly, adjacent to the control portion 26*b* of the bypass cavity 26. In the disclosed version, the control portion 26*b* of the bypass cavity 26 includes a stepped profile defining first and second shoulders 100, 102 and a threaded internal sidewall 104 in removable threaded engagement with a threaded external sidewall 106 of the bypass dome 94.

The bypass spacer 96 includes an annular body defining a through-bore 108 and a stepped profile that is complementary to the stepped profile of the control portion 26*b* of the bypass cavity 26. More specifically, the bypass spacer 96 includes an external stepped shoulder 110 that axially engages the first shoulder 100 of the bypass cavity 26. Moreover, as shown, the bypass dome 94 engages an end of the bypass spacer 96 that is opposite the first shoulder 100 of the bypass cavity 26. So configured, the bypass spacer 96 is sandwiched between the bypass dome 94 and the first shoulder 100 of the bypass cavity 26. Said another way, the bypass dome 94 retains the external stepped shoulder 110 of the bypass spacer 96 in contacting abutment with the first shoulder 100 of the bypass cavity 26.

Together, the bypass dome 94 and the bypass spacer 96 define a control cavity 112 that is disposed in the control portion 26*b* of the bypass cavity 26 and in which the bypass control assembly 98 primarily resides. The control cavity 112 in the disclosed version can also be vented through a vent port 115 disposed between the bypass spacer 96 and the bypass dome 94 and a corresponding through bore 117 defined through the side of the valve body 16.

This venting can facilitate proper operation of the bypass control assembly 98. The bypass control assembly 98 includes a control element 114 and a bypass biasing device 116. The control element 114 includes a cylindrically shaped valve member having a first end 114*a* and a second end 114*b*. The first end 114*a* of the disclosed version includes a first diameter D1 and a seating surface 120 with a tapered or bull-nosed profile, for example. The seating surface 120 is adapted to selectively engage a seating orifice 118 defined by the valve body 16 at an interface between the valve and control portions 26*a*, 26*b* of the bypass cavity 26 to selectively close the bypass valve 14 and prevent fluid from flowing through the bypass flow path FP2.

Still referring to the control element 114 of the bypass valve 14, the second end 114*b* includes a second diameter D2 that is larger than the first diameter D1 of the first end 114*a* and also includes a radial flange 122. The biasing device 116 includes a coil spring that is disposed in the control cavity 112 axially between the radial flange 122 of the control element 114 and the bypass spacer 96. So positioned, the biasing device 116 biases the seating surface 120 of the first end 114*a* of the control element 114 away from the seating orifice 118 and into the open position depicted in FIG. 1. In the depicted version, the radial flange 122 contacts an internal stepped shoulder surface 124 of the bypass dome 94 when in the open position to limit axial displacement of the control element 114 away from the seating orifice 118.

To facilitate automatic operation of the bypass valve 14, the control element 114 further includes a sensing bore 126 extending through the control element 114 between the first and second ends 114*a*, 114*b*. So disposed, any fluid pressure in the valve body 16 adjacent to the first end 114*a* of the control element 114 is automatically communicated through the sensing bore 126 to the second end 114*b* of the control element 114. Additionally, this same fluid pressure is also communicated to a sensing cavity 128 disposed between the second end 114*b* of the control element 114 and an adjacent interior wall 130 of the bypass dome 94. In this regard, the second end 114*b* of the control element 114 defines a sensing surface 132 opposing the internal wall 130 of the dome 94. As also shown in FIG. 1, a first sealing member 134, which can include an o-ring, for example, is disposed around the second end 114*b* of the control element 114 between the control element 114 and the bypass dome 94 such that the sensing cavity 128 is substantially fluid tight. Additionally, a second sealing member 135 can also be included around the first end 114*a* of the control element 114 providing a fluid tight seal between the first end 114*a* and the through-bore 108 in the bypass spacer 96. A third sealing member 137 can also be included between the bypass spacer 96 and in the interior wall of the bypass dome 94, as shown. So configured, the second and third sealing members 135, 137 serve to minimize or prevent fluid leakage from the gallery 22 and valve portion 26*a* of the bypass cavity 26 past the bypass spacer 96. In the version shown in FIG. 1, the first sealing member 134 is carried in an annular recess formed in the bypass dome 94, while the second and third sealing members 135, 137 are carried within annular recesses in the bypass spacer 96.

So configured, any increase in pressure at the seating surface 120 of the control element 114 will be automatically communicated to the sensing surface 132 on the opposite end of the control element 114. Moreover, because the diameter D2 of the second end 114*b* of the control element 114; and therefore of the sensing surface 132, is larger than the diameter D1 of the seating surface 120, the fluid force is the sensing cavity 128 biases the control element 114 toward a closed position in engagement with the seating orifice 118 of the valve body 16, as shown in FIG. 2. The amount of pressure required to move the control element 114 away from the open position depicted in FIG. 1 is dependent on the magnitude of force applied to the control element 114 by the bypass biasing device 116 and is generally referred to as the set-point pressure of the bypass device 14.

In order to perform a bypass operation with the presently disclosed fluid flow control device 10 under high flow velocity conditions, as discussed above, for example, the set-point pressure of the bypass device 14 is preferably less than the set-point pressure of the regulator 12. So configured, before any fluid is provided to the inlet 18 of the device 10, both the regulator control assembly 30 and the bypass control assembly 98 occupy the open positions depicted in FIG. 1. That is, the regulator control assembly 30 does not prevent fluid from flowing through the regulator flow path FP1 and the bypass control assembly 98 does not prevent fluid from flowing through the bypass flow path FP2. Thus, any fluid provided to the device 10 is free to flow through both the regulator and bypass flow paths FP1, FP2.

As the pressure at the inlet 18 of the valve body 16 begins to rise, the pressures in the gallery 22, the bypass cavity 26, and the regulator cavity 24 also begin to rise. Pressure in the bypass cavity 26 is continuously sensed by the sensing surface 132 carried by the second end 114b of the control element 114 of the bypass device 14 via the sensing bore 126. Similarly, pressure in the regulator cavity 24 is continuously sensed by the sensing surface 62 of the sensing element 54 of the regulator 12. As mentioned, the bypass set-point pressure is preferably lower that the regulator set-point pressure and, as such, the pressure in the valve body 16 surpasses the bypass set-point pressure, the fluid acts on the sensing surface 132 of the control element 114 and forces the control element 114 to overcome the spring force of the bypass biasing device 112 and move away from the open position depicted in FIG. 1 and ultimately into the closed position.

As shown in FIG. 2, when in the closed position, the seating surface 120 of the control element 114 engages the seating orifice 118 of the valve body 16 and closes the bypass device 14, thereby preventing fluid from flowing through the bypass flow path FP2. Again, the set-point pressure of the bypass device 14 of the presently disclosed control device 10 is lower than the set-point pressure of the regulator 12, and therefore, in FIG. 2, the regulator control assembly 30 of the regulator 12 remains in the open position. This state of the bypass device 14 and the regulator 12 resemble a normal operating condition, for example, when any downstream delivery line is pressurized the desired amount and the regulator 12 serves to maintain future supply at that desired pressure.

As discussed above with reference to FIG. 1, when both the regulator 12 and the bypass device 14 are open, fluid from the inlet 18 can flow along both the regulator and bypass flow paths FP1, FP2. In one version of the disclosed embodiment, the control device 10 can be worked such that a disproportionate amount of fluid naturally flows through the bypass device 14 in this situation. Specifically, in one version, an effective cross-sectional area of the bypass flow path FP2 when opened can be greater than an effective cross-sectional area of the regulator flow path FP1 when opened such that a majority of the flow actually travels through the bypass device 14 when both are open. In some versions, the ratio of the effective cross-sectional area of the bypass flow path FP2 to the regulator flow path FP1 can be in a range of approximately 10:1 to approximately 500:1, in a range of approximately 25:1 to approximately 500:1, in a range of approximately 50:1 to approximately 500:1, in a range of approximately 50:1 to approximately 400:1, in a range of approximately 50:1 to approximately 300:1, in a range of approximately 50:1 to approximately 200:1, in a range of approximately 50:1 to approximately 100:1, in a range of approximately 100:1 to approximately 500:1, in a range of approximately 200:1 to approximately 500:1, in a range of approximately 300:1 to approximately 500:1, in a range of approximately 400:1 to approximately 500:1, or any other ratio suitable for an intended application. The larger the ratio, the more fluid will be diverted through the bypass flow path FP2 when both the bypass device 14 and regulator 12 are open. In some other versions, the ratio could be smaller than any of those listed above including 1:1, if desired for a given application.

The fluid flow control device 10 of the present disclosure has thus far been described as being arranged such that both the regulator and bypass flow paths FP1, FP2 remain open when the associated regulator and bypass control assemblies 30, 98 are in their respective open positions. As discussed, this arrangement also allows fluid flowing through the device 10 to at least partly travel through the regulator 12. In a modified version of the fluid flow control device 10 depicted in FIGS. 5 and 6, however, the fluid flow control device 10 can be configured such that whenever the bypass device 14 is open, the regulator flow path FP1 is automatically closed through the incorporation of an additional biased valve member 200.

Figure 5:
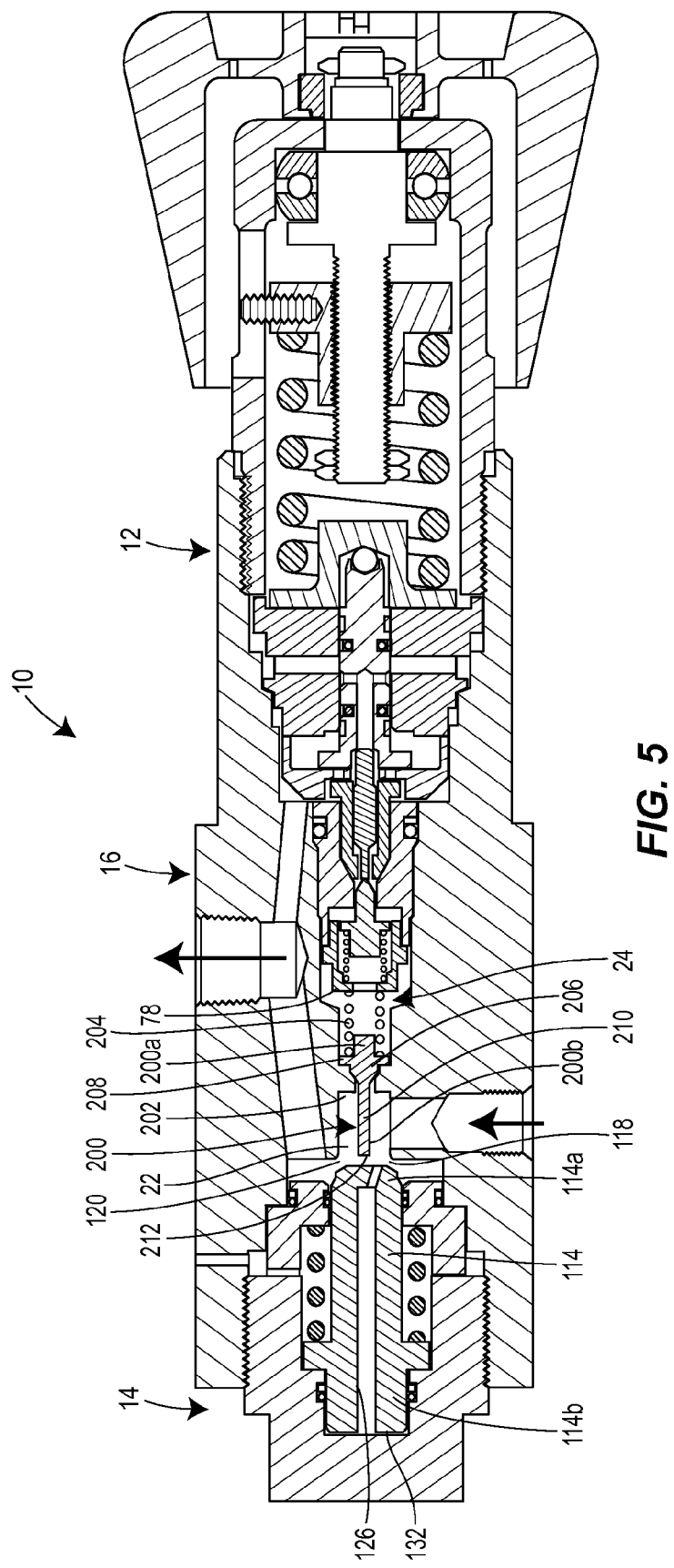
FIG. 5 is a side cross-sectional side view of another version of the fluid flow control device of the present disclosure, showing the bypass valve in an open position.
Figure 6:
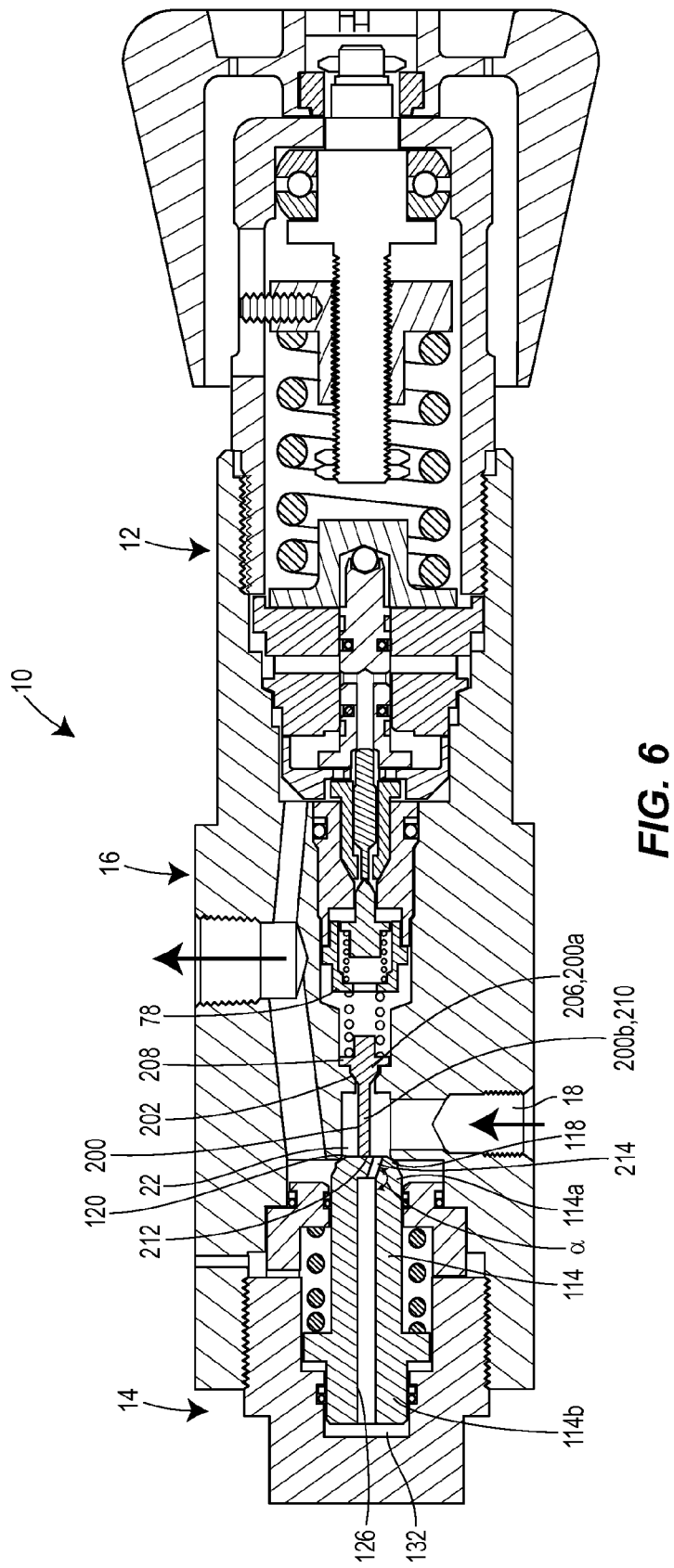
FIG. 6 is a cross-sectional side view of the fluid flow control device of FIG. 5, showing the bypass valve in a closed position.

As shown in FIGS. 5 and 6, this version of the fluid flow control device 10 generally resembles the fluid flow control device 10 described with reference to FIGS. 1-4 with the following distinctions. For example, the valve body 16 depicted in FIGS. 5 and 6 additionally defines an aperture 202 at a location at the interface between the gallery 22 and the regulator cavity 24. The biased valve member 200 is slidably disposed within the aperture 202 and movable between a closed position depicted in FIG. 5 and an open position depicted in FIG. 6 depending on the position of the bypass device 14. Further yet, as shown, the device 10 includes an additional biasing device 204 disposed in the regulator cavity 24 between the biased valve member 200 and the second retainer element 78 for biasing the biased valve member 200 into the closed position.

The biased valve member 200 generally includes an elongated body having a first end 200a and a second end 200b. The first end 200a includes a tapered seating portion 206 for selectively seating against the aperture 202 and a radial flange 208 for serving as a spring seat. The second end 200b includes a needle portion 210 extending from the tapered seating portion 206, through the aperture 202, and into the gallery 22 of the valve body 16. The needle portion 210 is narrower than the aperture 202 to prevent interference. As shown in FIG. 5, when the biasing device 204 urges the biased valve member 200 into the closed position, the tapered seating portion 206 engages the aperture 202 in the valve body 16, thereby substantially blocking communication between the gallery 22 and the regulator cavity 24. However, as shown in FIG. 6, as pressure at the inlet 18 surpasses the set-point pressure of the bypass device 14, the control element 114 moves out of the open position and into the closed position (as described above with respect to FIGS. 1-3, for example) such that the seating surface 120 engages the seating orifice 118 to close the bypass device 14.

In the version depicted in FIGS. 5 and 6, the first end 114a of the control element 114 also engages a distal end surface 212 of the second end 200b of the biased valve member 200 and automatically urges the tapered seating portion 206 of the biased valve member 200 away from the aperture 202 against the force of the biasing device 204. This creates a gap between the aperture 202 and the tapered seating portion 206, which effectively opens the aperture 202, as shown in FIG. 6, to allow fluid pressure to travel into the regulator cavity 24 and communicate with the regulator 12 during normal operation.

Thus, one advantage of the version depicted in FIGS. 5 and 6 is that the biased valve member 200 substantially completely divorces the regulator 12 from operation while the bypass device 14 performs the bypass function. This divorcing of the regulator 12 can further extend the useful life of the regulator 12. One additional modification to the device 10 depicted in FIGS. 5 and 6, relative to the prior versions, is the design of the sensing bore 126 in the control element 114. As can be seen, the sensing bore 126 of this version includes a slanted conduit portion 214 (identified in FIG. 6) immediately adjacent to the first end 114a of the control element 114. This slanted conduit portion 214 is slanted at an angle α relative to the longitudinal axis of the sensing bore 126. The angle α can generally be any angle sufficient to move the opening in the first end 114a of the control element 114 out of the way of the valving member 200 such as, for example, 135°. So configured, the slanted conduit portion 214 can help ensure that the sensing bore 126 effectively and without obstruction communicates pressure from the gallery 22 to the sensing surface 132 on the opposite second end 114b of the control element 114 even while contacting the distal end surface 212 of the biased valve member 200, as shown in FIG. 6.

Figure 7:
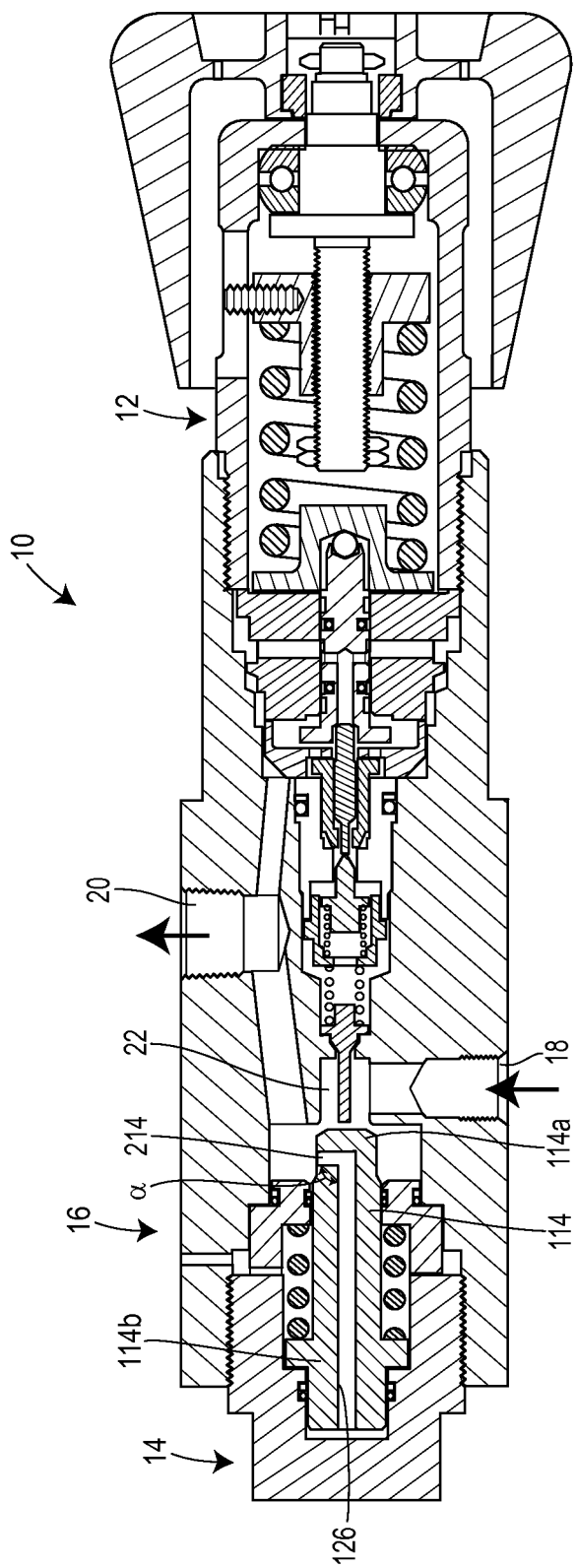
FIG. 7 is a cross-sectional side view of yet another version of the fluid flow control device of the present disclosure, showing the bypass valve in an open position.
Figure 9:
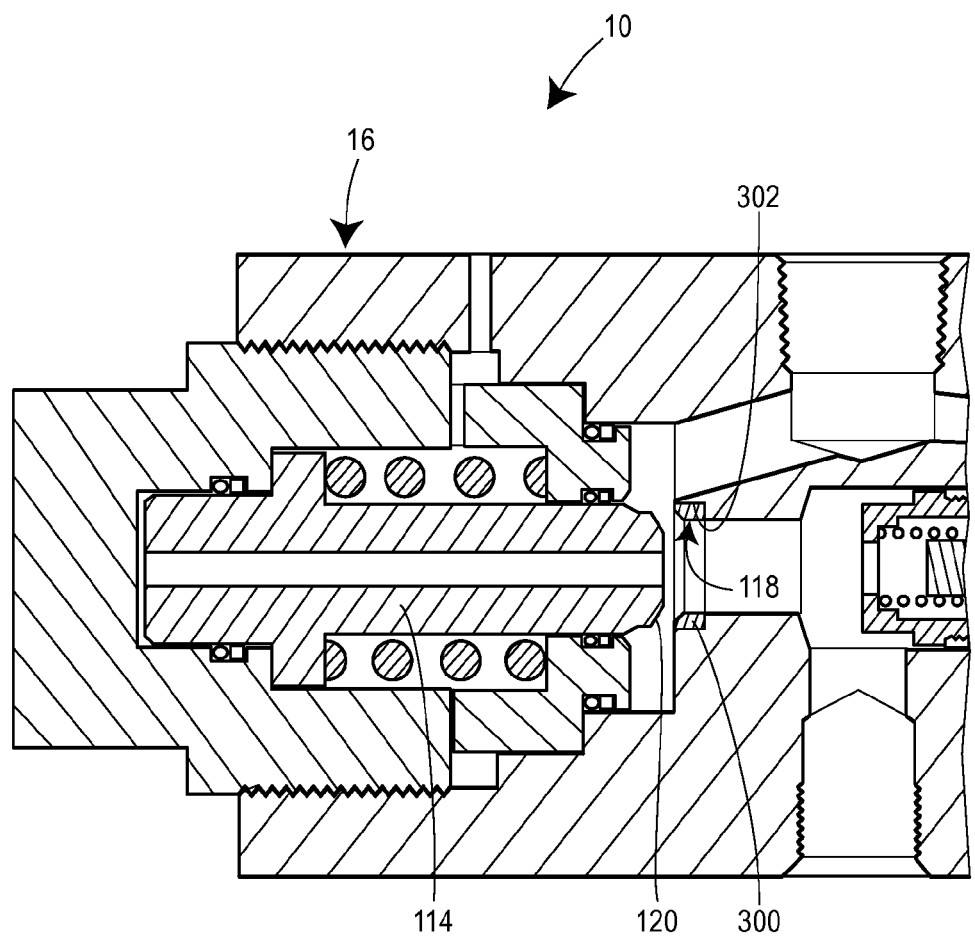
FIG. 9 is a partial detail view of the bypass valve of the fluid flow control device of FIGS. 1 and 2, illustrating a modified seating orifice suitable for any of the fluid flow control devices disclosed relative to FIGS. 1 through 8.

FIGS. 7 and 9 show another modification of the version of FIGS. 5 and 6. In FIGS. 7 and 9, the angle α of the slanted conduit portion 214 is approximately 90°. So configured, the opening of the sensing bore 126 adjacent to the first end 114a of the control element 114 communicates with the outlet 20 of the valve body 16 when the bypass device 14 is in the closed position. This configuration may be advantageous in pneumatic applications, for example, for detecting downstream pressure losses, which might require or desire a re-opening of the bypass device 14.

Although not expressly discussed above, it should be understood that when the bypass device of any of FIGS. 1-6 is in the closed position, the sensing bore 126 in the control element 114 continues to detect the pressure at the inlet 18 and gallery 22 of the valve body 16. This occurs even as the pressure at the inlet 18 and gallery 22 rise well-above the set-point pressure of the bypass device 14. Thus, as the pressure increases at the inlet 18 and gallery 22, the pressure in the sensing cavity 128, which acts on the sensing surface 132 at the second end 114b of the control element 114, also increases. This increase in pressure on the sensing surface 132 applies a further force urging the seating surface 120 of the control element 114 into stronger engagement with the seating orifice 118 of the valve body 16. Depending on the forces involved and the duration of use, such engagement could wear the seating orifice 118. Thus, as shown in FIG. 9, one version of the bypass device 14 of the presently disclosed fluid flow control device 10 can further include a hardened insert 300 carried within an annular recess 302 formed in the seating orifice 118. This hardened insert 300 could be formed of a hardened steel, a ceramic, or any other suitable material. In some versions, the seating surface 120 of the control element 114 could also or alternatively include a similar hardened insert. In other versions, the insert 300 might not be a hardened insert but rather a softened insert constructed of a material such as rubber or plastic, for example. Such a softened insert might be advantageous in situations where the set-point pressures of the bypass device 14 and the regulator 12 are not that different or where, for example, the device 10 is used in a pneumatic system such as to provide more fluid tight sealing.

Figure 10:
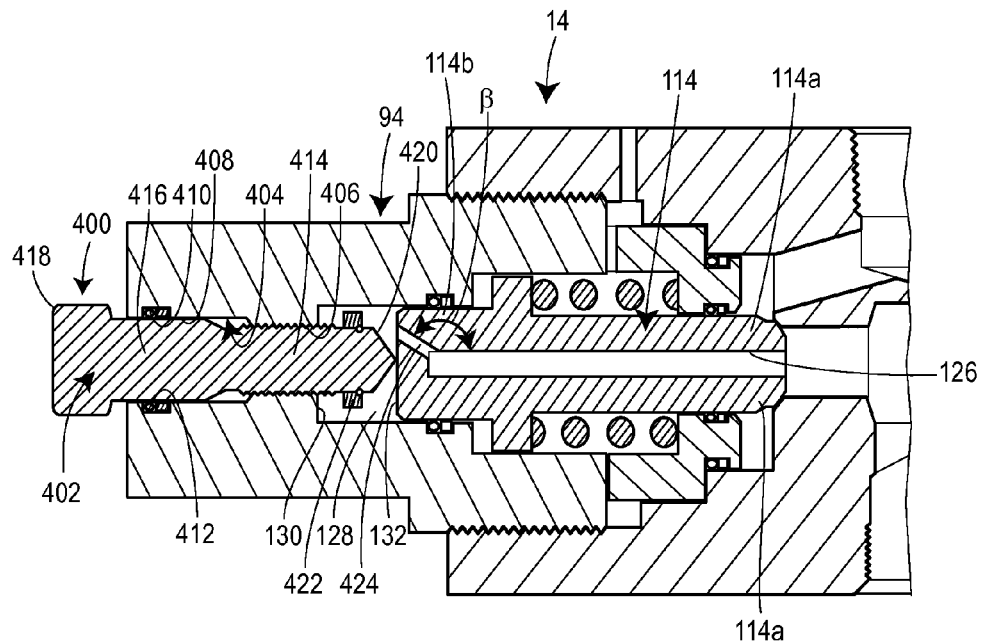
FIG. 10 is a partial detail view of an alternate bypass valve of the present disclosure including an override lock suitable for any of the fluid flow control devices of the present disclosure, showing the override lock in a locked position.
Figure 11:
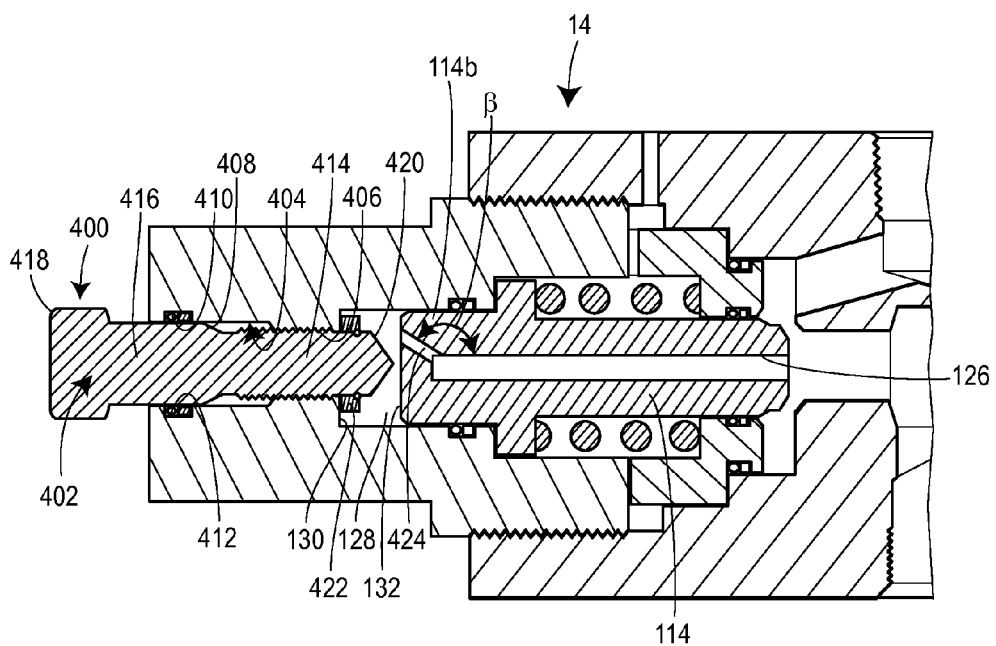
FIG. 11 is the partial detail view of the alternate bypass valve of FIG. 10, showing the override lock in an unlocked position.

Finally, FIGS. 10 and 11 depict yet another modified version of the bypass device 14 of the presently disclosed fluid flow control device 10. In FIGS. 10 and 11, the bypass device 14 is generally the same as the bypass device 14 depicted and described with reference to previous figures but also includes an override lock 400 for selectively locking the control element 114 in the closed position. As shown, the override lock 400 depicted in FIGS. 10 and 11 includes a threaded shaft 402 movably disposed within a threaded bore 404 formed in the bypass dome 94. The threaded shaft 402 is movable between an unlocked position (FIG. 11) such that it does not interfere with the operation of the control element 114 and a locked position (FIG. 10) where it restrains the control element 114 in the closed position.

Still referring to FIGS. 10 and 11, the threaded bore 404 of the present version includes a threaded portion 406 and a non-threaded portion 408. The non-threaded portion 408 has a diameter that is larger than the threaded portion 406 and also includes an annular recess 410 accommodating one or more sealing elements 412. The threaded shaft 402 includes a threaded portion 414, a non-threaded portion 416, and a head 418. The threaded portion 414 of the shaft 402 is in threaded engagement with the threaded portion 406 of the threaded bore 404 in the bypass dome 94 and extends away from the non-threaded portion 416 to a conical distal end 420 that resides within the sensing cavity 128 of the bypass dome 94. The distal end 420 additionally accommodates a snap ring 422 for limiting movement of the threaded shaft 402 by engaging the interior wall 130 of the bypass dome 94, as it approaches the unlocked position shown in FIG. 11.

As depicted, the non-threaded portion 416 of the threaded shaft 402 has a diameter that is larger than the threaded portion 414 such that a cross-sectional profile of the threaded shaft 402 generally corresponds to the cross-sectional profile of the threaded bore 404. As such, the one or more sealing elements 412 carried by the dome 94 radially engage the non-threaded portion 416 to provide a fluid tight seal therebetween. This seal prevents fluid from leaking from the sensing cavity 128 out of the threaded bore 404.

The head 418 of the threaded shaft 402 is disposed outside of the dome 94 and is dimensioned larger than the non-threaded portion 416. The head 418 can include a knurled surface for facilitating manual adjustment by hand, a hexagonal head, for example, for being manipulated through the use of a tool, or any other construct suitable for the intended purpose.

Finally, to ensure that the override lock 400 does not interfere with the ability of the sensing bore 126 to effectively communicate operating pressures in the valve body 16 to the sensing cavity 128, the sensing bore 126 in the version depicted in FIGS. 10 and 11 includes a slanted conduit portion 424 adjacent the second end 114b of the control element 114. The slanted conduit portion 424 can be disposed at an angle B relative 40 the longitudinal axis of the control element 114, wherein the angle B is sufficiently acute to position the opening in the sensing surface 132 of the control element 114 away from where the threaded shaft 402 contacts the control element 114, as shown FIG. 10, for example. In some versions, the angel B can be approximately 135° or any other suitable angle.

With the override lock 400 configured as described, it should be appreciated that the threaded shaft 402 can easily be moved between the locked position (FIG. 10) and the unlocked position (FIG. 11) by simply rotation of the head 418, which causes the threaded shaft 402 to axially displace in response to relative movement of the threaded portions 406, 414.

Being able to selectively lock the control element 114 in the closed position (FIG. 10) advantageously allows the fluid flow control device 10 to be used for low-pressure application (i.e., pressures lower than the bypass set-point pressure of the bypass device 14). That is, with the bypass device 14 locked closed, the regulator 12 of the fluid flow control device 10 is allowed to deliver fluid to the outlet 20 of the valve body 16 normally even when pressures at the inlet 18 of the valve body 16 are lower than the bypass set-point pressure of the bypass device 16. Another advantage of being able to lock the control element 114 in the closed position is that it can facilitate the performance of a leak test, for example, on the regulator 12. By locking the bypass device 14 closed, substantially all of the fluid supplied to the inlet 18 of the valve body 16 flows through the regulator 12 via the regulator flow path FP1.

Based on the foregoing description of the example fluid flow control device 10, the present disclosure also pertains to a method of pressurizing a fluid line, for example, located downstream of the fluid flow control device 10 using the fluid flow control device 10. That is, according to such a method, the fluid flow control device 10 disclosed herein advantageously provides an automatically opening and closing bypass valve 14 and automatically operating regulator 12.

According to such a method, initially, fluid would be supplied to the inlet 18 of the valve body 16 of the fluid flow control device 10 at a generally low pressure but potentially high flow rate. In this condition, the bypass biasing device 116 automatically biases the bypass control assembly 98 of the bypass device 14 into the open position, as depicted in FIG. 1. Additionally, the regulator biasing device 50 automatically biases the regulator control assembly 30 of the regulator 12 into the open position depicted in FIG. 1. So configured, the bypass and regulator control assemblies 98, 30 do not prevent fluid from flowing through the bypass and regulator flow paths FP2, FP1.

In the version of the fluid flow control device 10 disclosed herein, the bypass control assembly 98 is biased into the open position via the urging of the bypass biasing device 116, which can include a coil spring, for example. The coil spring biases the control element 114 of the bypass control assembly 98 away from the seating orifice 118 of the valve body 16. Similarly, the regulator control assembly 98 is biased into the open position via the urging of the regulator biasing device 50, which can also include a coil spring. The regulator biasing device 50 biases the regulator control element 58 (aka the valve stem 58) of the regulator control assembly 30 away from the seating orifice 70 of the valve seat 68.

Furthermore, in the above-described condition when both the bypass device 14 and the regulator 12 are in the open positions, the bypass device 14 continuously senses a pressure of the fluid in the gallery 22 of the valve body 16, which correlates to a pressure at the inlet 18 of the valve body 16, with the sensing surface 132 on the second end 114b of the control element 114 of the bypass control assembly 98 via the sensing bore 126. Simultaneously, the regulator 12 continuously senses the same pressure in the valve body 16 with the sensing surface 62 on the second end 54a of the sensing element 54 of the regulator control assembly 30.

As soon as the pressure at the inlet 18 of the valve body 16, and therefore in the gallery 22 of the valve body 16, reaches or exceeds a predetermined bypass set-point pressure, this is sensed by the sensing surface 132 of the control element 114 of the bypass device 14 and the bypass control assembly 98 automatically moves into the closed position depicted in FIG. 2, for example. More specifically, the pressure in the valve body 16 is communicated to the sensing cavity 128 via the sensing bore 126 and is applied to the sensing surface 132 to force the control element 114 against the bias of the bypass biasing device 116 until the seating surface 120 on the first end 114a engages and seats against the seating orifice 118. In this configuration, the bypass device 14 prevents fluid from flowing through the bypass flow path FP2.

As long as the pressure in the valve body 16 is higher than the bypass set-point pressure and lower than the regulator set-point pressure, the regulator 12 remains open to allow the flow of fluid through the fluid flow control device 10. Thus, the disclosed method further includes maintaining the regulator control assembly 30 in its open position, depicted in FIGS. 1-3, when the pressure sensed by the sensing surface 62 of the sensing element 54 of the regulator control assembly 30 is equal to or greater than the bypass set-point pressure. Moreover, the method also includes automatically moving the regulator control assembly 30 into the closed position when the pressure sensed by the sensing surface 62 of the sensing element 54 is equal to or greater than the regulator set-point pressure. In the closed position, the regulator control assembly 38 effectively prevents fluid from flowing through the regulator flow path FP1 by causing the regulator control element 58 to engage and seat against the seating orifice 70 of the valve seat 68.

The foregoing describes the basic method performed by the fluid flow control device 10 of the present disclosure. With respect to the modification disclosed relative to FIGS. 5 and 6, for example, the disclosure also includes automatically closing the regulator flow path FP1 when the bypass flow path FP2 is open. Moreover, it can include automatically opening the regulator flow path FP1 when the bypass flow path FP2 is closed. In one example, this can be achieved by automatically positioning the biased valve member 200 of FIGS. 5 and 6 into the closed position (FIG. 5) when the bypass control assembly 98 is in the open position to prevent fluid from flowing to the regulator flow path FP1, and automatically positioning the biased valve member 200 in the open position (FIG. 6) when the bypass control assembly 98 is in the closed position to allow fluid to flow to the regulator flow path FP1. Automatically positioning the biased valve member 200 in the closed position can include biasing the valve member 200 into engagement with the aperture 202 formed by the valve body 16 between the gallery 22 and the regulator cavity 24 with the spring 204. Thus, in order to automatically position the valve member 200 in the open position, the valve member 200 is pushed away from the aperture 202 with the bypass control element 114 as the bypass control element 114 moves into the closed position, as shown in FIG. 6.

Figure 8:
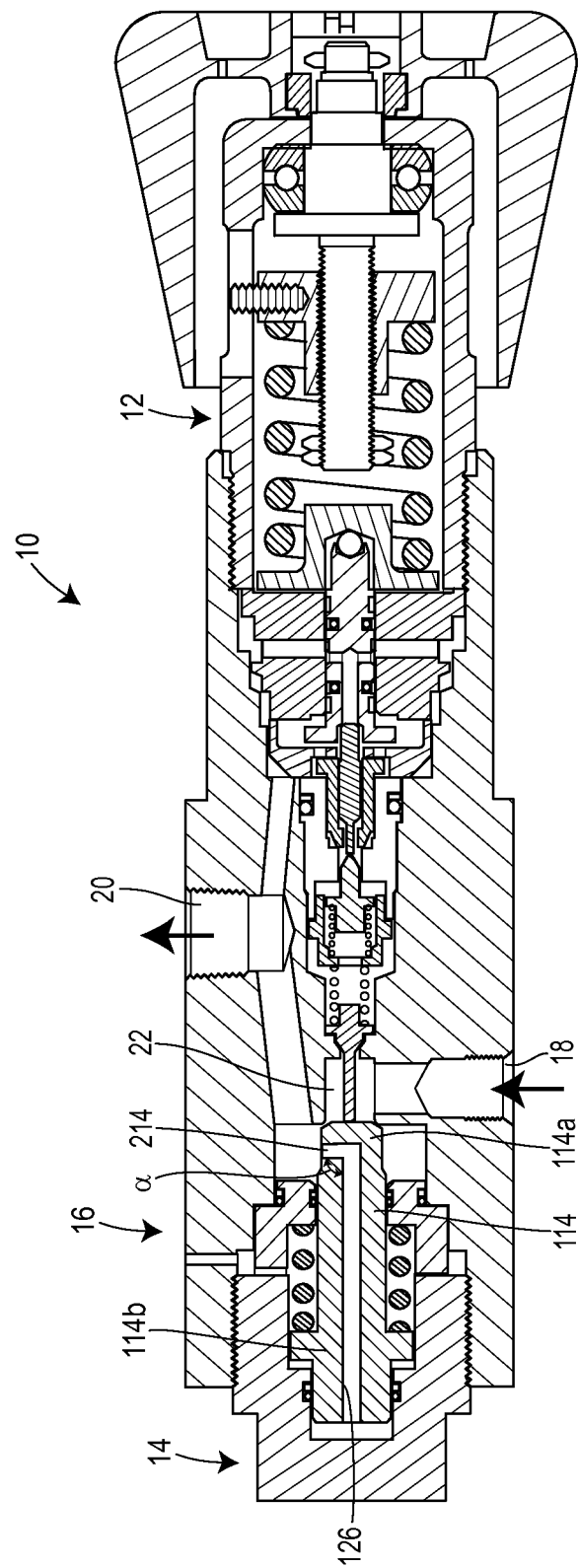
FIG. 8 is a cross-sectional side view of the fluid flow control device of FIG. 7, showing the bypass valve in a closed position.

In yet another version, the method can also include sensing a pressure at the outlet 20 of the valve body 16 when the bypass valve 14 is closed such that if there is a reduction in pressure downstream from the outlet 20, the bypass valve 14 would sense this reduction and automatically re-open. This can be accomplished with the structure disclosed above with reference to FIGS. 7 and 8, as described, and the method for pressurization further includes sensing the pressure at the outlet 20 with the same sensing surface 132 of the control element 114 of the bypass control assembly 98 when the bypass control assembly 98 is in the closed position.

In view of the foregoing, it should be appreciated that the scope and content of the present disclosure is illustrative only and the invention is not to be limited by any of the particular examples, but rather, the invention is defined by the scope of the following claims including any equivalents thereof. Moreover, while various different versions of the disclosure are presented in different figures, for example, any of the versions or any aspects of the versions can be combined. As such, each different version is not intended to be independent and distinct from the other versions. Rather, all versions are intended to be complementary to the other, to the extent possible within the technical field.

We claim:

1. A fluid flow control device, comprising:
   a valve body defining an inlet, an outlet, a gallery disposed between the inlet and the outlet, a regulator cavity disposed between the gallery and the outlet, and a bypass cavity disposed between the gallery and the outlet;
   a regulator flow path extending between the inlet and the outlet of the valve body via the gallery and the regulator cavity, the regulator flow path having a first effective cross-sectional area;
   a bypass flow path extending between the inlet and the outlet of the valve body via the gallery and the bypass cavity, the bypass flow path having a second effective cross-sectional area that is greater than the first effective cross-sectional area;

a bypass valve connected to the valve body and including a bypass control assembly, the bypass control assembly including a bypass control element and a bypass biasing device, the bypass control element being movable relative to the bypass cavity of the valve body between an open position allowing fluid flow through the bypass flow path and a closed position preventing fluid flow through the bypass flow path, the bypass biasing device urging the bypass control element toward the open position such that the bypass control element only occupies the closed position when a fluid pressure in the bypass cavity is equal to or greater than a bypass set-point pressure; and a regulator connected to the valve body and including a regulator control assembly, the regulator control assembly including a regulator control element and a regulator biasing device, the regulator control element being movable relative to the regulator cavity of the valve body between an open position, which does not prevent fluid from flowing through the regulator flow path, and a closed position, which does prevent fluid from flowing through the regulator flow path, the regulator biasing device urging the regulator control element toward the open position such that the regulator control element occupies the open position until a fluid pressure in the regulator cavity of the valve body is equal to or greater than a regulator set-point pressure, wherein the regulator set-point pressure is greater than the bypass set-point pressure.

2. The device of claim 1, wherein the valve body comprises a single piece of material defining the inlet, the outlet, the gallery, the regulator cavity, and the bypass cavity.

3. The device of claim 1, wherein a ratio of the second effective cross-sectional area to the first effective cross-sectional area is in a range of approximately 10:1 to approximately 500:1.

4. The device of claim 1, wherein a ratio of the second effective cross-sectional area to the first effective cross-sectional area is in a range of approximately 50:1 to approximately 300:1.

5. The device of claim 1, wherein the bypass valve further comprises an override lock that is movable between a locked position engaging and restraining the bypass control element in the closed position and an unlocked position allowing the bypass control element to freely move between the opened and closed positions.

6. The device of claim 1, wherein the valve body further defines an aperture disposed between the gallery and the regulator cavity and the device further comprises a biased valve member disposed in at least one of the regulator cavity and the gallery, the biased valve member occupying a closed position in engagement with the aperture and preventing fluid flow through the regulator flow path when the bypass control element is in the open position and occupying an open position displaced from engagement with the aperture when the bypass control element is in the closed position.

7. The device of claim 1, wherein the valve body further defines a seating orifice adjacent to the bypass cavity, the seating orifice adapted to be engaged by the bypass control element when the bypass control element is in the closed position.

8. The device of claim 7, wherein the bypass valve further comprises a bypass dome removably connected to the valve body adjacent to the bypass cavity such that that the bypass control element and the bypass biasing device are disposed between the bypass dome and the seating orifice of the valve body.

9. The device of claim 8, wherein the bypass control element further comprises a sensing surface disposed adjacent to the bypass dome and a sensing bore extending through the bypass control element, the sensing bore providing fluid communication between the gallery of the valve body and the sensing surface at least when the bypass control element is in the open position.

10. The device of claim 9, wherein the bypass biasing device comprises a coil spring biasing the bypass control element away from the seating orifice and toward the bypass dome.

11. A fluid flow control device, comprising:
a valve body defining an inlet, an outlet, a gallery disposed between the inlet and the outlet, a regulator cavity disposed between the gallery and the outlet, a bypass cavity disposed between the gallery and the outlet, and a seating orifice disposed in the bypass cavity;

a regulator flow path extending between the inlet and the outlet of the valve body via the gallery and the regulator cavity;

a bypass flow path extending between the inlet and the outlet of the valve body via the gallery and the bypass cavity;

a regulator connected to the valve body for controlling the flow of fluid along the regulator flow path, the regulator including a regulator control assembly configured to occupy an open position, which does not prevent fluid from flowing through the regulator flow path, and a closed position, which does prevent fluid from flowing through the regulator flow path, the regulator control assembly further being biased into the open position such that the regulator control assembly occupies the open position until a fluid pressure in the gallery sensed by the regulator is equal to or greater than a regulator set-point pressure; and a bypass valve connected to the valve body and including a bypass dome, a bypass control element, and a bypass biasing device, the bypass dome removably connected to the valve body adjacent to the bypass cavity, the bypass control element slidably disposed in the bypass cavity and including a first end defining a seating surface disposed adjacent to the seating orifice and a second end defining a sensing surface disposed adjacent to the bypass dome, the bypass biasing device disposed between the bypass control element and the seating orifice, the bypass control element being movable between an open position, wherein the seating surface is spaced away from the seating orifice, and a closed position, wherein the seating surface engages the seating orifice, the bypass biasing device urging the bypass control element toward the open position such that the bypass control element occupies the open position until a fluid pressure in the gallery sensed by the sensing surface of the bypass control element is equal to or greater than a bypass set-point pressure, wherein the bypass set-point pressure is less than the regulator set-point pressure.

12. The device of claim 11, wherein the valve body comprises a single piece of material defining the inlet, the outlet, the gallery, the regulator cavity, the bypass cavity, and the seating orifice.

13. The device of claim 11, wherein the bypass control element further comprises a sensing bore extending through the bypass control element from the first end to the second end, the sensing bore providing fluid communication between the gallery of the valve body and the sensing surface of the bypass control element when the bypass control element is in the open position.

14. The device of claim 11, further comprising a spacer fixed in the bypass cavity between the bypass biasing device and the seating orifice and defining a guide bore through which the bypass control element is slidably disposed.

15. The device of claim 11, wherein the bypass biasing device comprises a coil spring.

16. The device of claim 11, wherein the bypass valve further comprises an override lock that is movable between a locked position engaging and restraining the bypass control element in the closed position and an unlocked position allowing the bypass control element to freely move between the opened and closed positions.

17. The device of claim 11, wherein the valve body further defines an aperture disposed between the gallery and the regulator cavity and the regulator further comprises a biased valve member disposed in at least one of the regulator cavity and the gallery, the biased valve member occupying a closed position in engagement with the aperture and preventing fluid flow through the regulator flow path when the bypass control element is in the open position and occupying an open position displaced from engagement with the aperture when the bypass control element is in the closed position.

18. The device of claim 11, wherein the regulator flow path has a first effective cross-sectional area and the bypass flow path has a second effective cross-sectional area that is greater than the first effective cross-sectional area.

19. The device of claim 18, wherein a ratio of the second effective cross-sectional area to the first effective cross-sectional area is in a range of approximately 10:1 to approximately 500:1.

20. The device of claim 18, wherein a ratio of the second effective cross-sectional area to the first effective cross-sectional area is in a range of approximately 50:1 to approximately 300:1.

* * * * *

UNITED STATES PATENT AND TRADEMARK OFFICE
CERTIFICATE OF CORRECTION

| | | |
|---|---|---|
| PATENT NO. | : 9,157,540 B2 | Page 1 of 1 |
| APPLICATION NO. | : 13/751904 | |
| DATED | : October 13, 2015 | |
| INVENTOR(S) | : Todd William Larsen et al. | |

It is certified that error appears in the above-identified patent and that said Letters Patent is hereby corrected as shown below:

In the Specification:

At Column 6, line 53, "t the" should be -- the --.

At Column 11, line 24, "rise" should be -- rises --.

Signed and Sealed this
Fifth Day of July, 2016

Michelle K. Lee
*Director of the United States Patent and Trademark Office*